Jan. 21, 1930.  C. W. THOMPSON  1,744,514
HYDRAULIC VALVE
Filed Aug. 28, 1928

INVENTOR
CLARANCE W. THOMPSON
BY
ATTORNEYS.

Patented Jan. 21, 1930

1,744,514

UNITED STATES PATENT OFFICE

CLARANCE W. THOMPSON, OF WILMINGTON, DELAWARE

HYDRAULIC VALVE

Application filed August 28, 1928. Serial No. 302,503.

My invention relates to hydraulic valves which are used for shock absorbers for automobiles, although it will be apparent from the following description that it is capable of use in many ways, for example, in braking systems, door checks, airplane landing equipment, automobile bumpers, spring controlling equipment, and indeed many places where it is desirable to provide for a hydraulic device which will check, or gradually absorb, shock without causing or permitting any rebound, and where a constant or fixed checking pressure is objectionable.

The device which will be produced by the utilization of this invention will constitute a shock absorber provided with hydraulic valves, having its parts so formed and arranged that when associated with relatively movable parts, it will have a ratio of three different pressures during its continuous movement in a single direction. This movement is produced by the association, in a cylinder having a piston reciprocable therein, of ports or passages in the cylinder walls, whose aggregate area varies longitudinally, other ports or passages through the piston head, a bottom valve member placed below the piston, a top valve member mounted in the upper part of the cylinder, which normally abuts a seat in the side wall of the cylinder (which is more clearly shown in Fig. 4), and an intermediate valve member mounted above the piston. These various valve members and ports, in the association and operation hereinafter described, produce the foregoing ratio; that is to say, if we assume a condition where the piston is in the normal position which it will occupy when the automobile is loaded, there will be substantially no resistance to the upward movement of the piston, but a slight resistance to its downward movement, due to the variation between the valves used to retard the flow of the fluid through the ports which are formed in the piston. Assuming the continued movement of the piston in an upward direction, it is obvious that the intermediate valve will partially close the piston ports in order to effect the desired ratio. The entire description is based on the assumption that the shock absorber is mounted vertically on the automobile.

As the piston, in its continued upward movement, leaves what I term the neutral position of the wall or side ports, i. e., where the area of said ports is equal in both directions, the piston will contact with the upper or top valve member, which, as illustrated, is held, by a suitable spring, to a seat formed in the side wall. As illustrated, I have employed a coil spring, the sole function of which is to hold this top valve member to its seat. Upon coming into this contact, the top valve member will automatically close the remaining ports through the piston which were not closed by the operation of the intermediate valve member, thus producing a second ratio of pressure. By arranging ports of varying length in the side walls, it will be obvious that as the piston passes the termination of each port the resistance will be gradually and automatically increased until it passes the last side wall port, when the third ratio will be in effect, and no fluid can pass the piston at all.

At this moment, the piston will start its downward movement, with the following effect: The fluid will press the bottom valve member against the lower surface of the piston, thereby closing a predetermined number of ports in the piston until the passage of the fluid through the unclosed port or ports will operate to open the intermediate valve member. The continued downward movement of the piston will gradually open the side wall ports one by one until the piston is in its normal position under load, when the top valve member will reach its seat and no longer contact the piston. From its neutral loaded position, as the piston continues to move downwardly, the pressure will be gradually increased as the side wall ports are closed one by one, and the ratio from that point will be whatever has been predetermined in calculating the area of the ports not covered by the bottom valve member.

This construction may afford greater resistance of action in one direction than in the other, when the piston is functioning below its normal position, or at the lower end of the side wall ports, this being due to the bottom movable valve member, which coacts with the ports through the piston, and may be arranged to produce any desired ratio.

When the piston is in the normal position, the resistance gradually increases with the movement in either direction. When the piston moves towards the neutral or normal position from either direction, there is a lesser resistance to movement, when the piston is within the normal range of action of the side wall ports.

The principal object of my invention is the production of a shock absorber in which the hydraulic valves are so arranged that the movement of the piston in an upward direction has three distinct ratios of pressure for the one stroke.

My invention has for a further object, to provide a hydraulic valve that will automatically function as a two-way valve, or double-acting valve, that is to say, one that will function automatically in either direction of piston movement, under an automatic combination of pressure, including both high and low pressure, operating in either direction of piston movement without any adjustment.

My means of accomplishing the foregoing objects may be more readily understood by having reference to the accompanying drawings, which are hereunto annexed and are made a part of this specification. These drawings are furnished to illustrate a specific concrete embodiment of my invention, but it will be apparent from the hereinafter contained description that the invention is not limited to the specific construction therein illustrated; therefore I do not wish to be understood as limiting myself to the disclosure thus made, except as such limitations may appear in the hereinafter appended claims.

Similar reference numbers refer to similar parts in various views of the drawings, in which—

Figure 1:
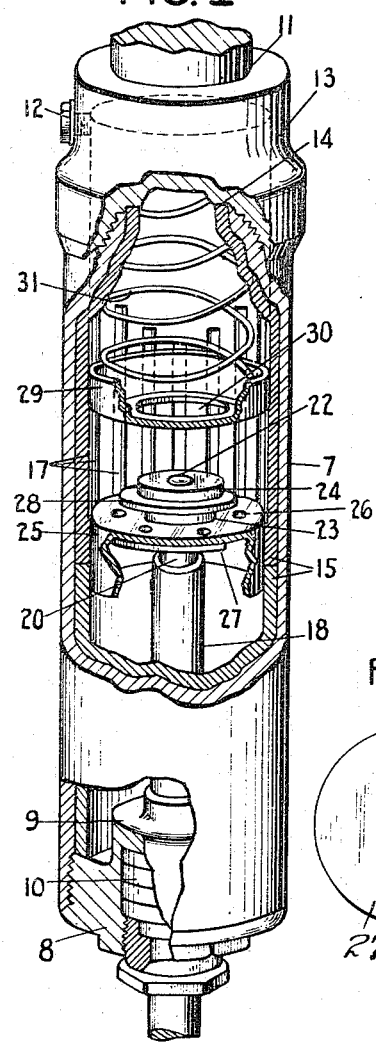
Fig. 1 is a side elevation of a shock absorber embodying my invention, part of the exterior being broken away to show the interior mechanism in perspective.

As shown in the drawings, the devices includes a cylindrical casing 7. The casing 7 is closed at one end by a plug 8, which may be screwed thereinto or otherwise suitably fastened with a fluid-tight joint, and contains a stuffing-box 9 with rod-packing 10 therein, as shown by Figs. 1 and 2.

At the other end the casing 7 is closed by a cap 11, having a port, closed by a plug 12, through which the device may be charged with or drained of oil or other fluid. The cap 11 includes a sleeve 13, which is screwed, or otherwise suitably secured, to the casing 7 with a fluid-tight joint. The cap 11 constitutes a continuation of the casing 7, and it contains a continuation of the chamber in the casing 7.

Figure 2:
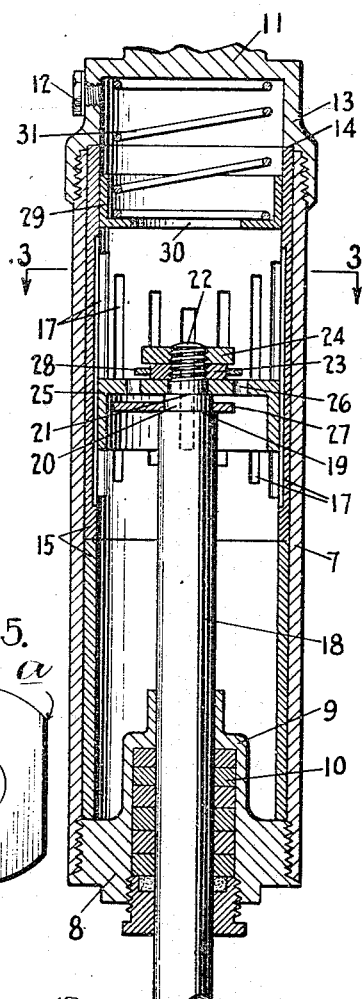
Fig. 2 is a vertical sectional view of the same.

In Figs. 1 and 2, the cap 11 has an annular abutment 14 projecting inwardly of the casing-wall and arranged to abut an end of a lining or bushing 15 as the cap 11 is turned on, and thus to hold the bushing 15 in the casing 7 against the plug 12 or other part at the other end. If desired, the bushing 15 may be made in two parts, jointed as shown by Fig. 2. The bushing 15 conforms to the contour of, and closely fits, the inner surface of the casing 7.

For purposes hereinafter explained, the interior of the casing 7 is provided with side or wall ports, which may be grooves or channels in the bushing 15 (as seen in Figs. 1 and 2). These side ports may have substantially parallel sides, such as those designated by 17 in Fig. 2; or they may have any other suitable characteristics; and they are of such size and number as may be necessary to meet the requirement hereinafter explained.

A piston-rod 18 is reciprocable in the stuffing-box 9, and it extends into the chamber of the casing 7. It has on its inner end portion an annular shoulder or seat 19, a part 20 of less diameter extending therefrom and having at its end an annular shoulder or seat 21, and a threaded terminal 22 of less diameter, carrying a cylindrical nut 23 and a binding or lock nut 24.

A piston 25, reciprocable in the chamber in close contact with the wall of the bushing 15, as shown in Figs. 1 and 2, is held on the piston-rod 18 against the shoulder 21 by nuts 23 and 24. Ports 26, preferably equally spaced, extend through the piston-head.

Figure 5:
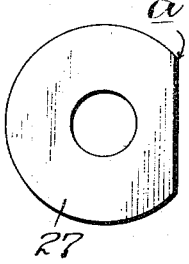
Fig. 5 is a detail view of the bottom valve member.
Figure 3:
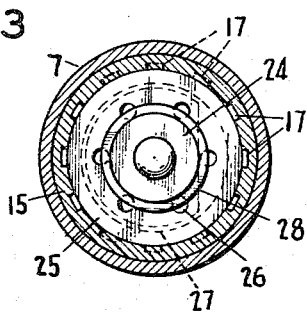
Fig. 3 is a cross-section taken on the line 3—3 in Fig. 2.
Figure 4:
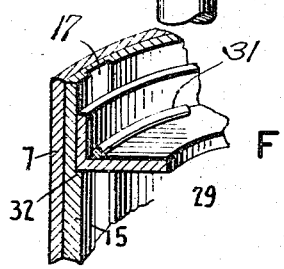
Fig. 4 is an enlarged fragmentary detail view showing the seat for the top valve member.

A bottom valve member 27, of substantially washer-like form, is movable freely on the reduced part 20 of the piston-rod 18 between the shoulder 19 and the bottom of the piston-head, which parts limit its movement. This bottom valve member 27 has a segmental portion cut away as shown in Fig. 5 in order that one or more of the port openings 26 may be left uncovered. It is formed to seat, at times, closely against the bottom of the piston-head, and in that position to close, or partially close, the ports 26, and thus cover or reduce the area of the ports available for fluid flow therethrough.

An intermediate valve member 28, also of washer-like form similar to that of valve member 27, may be positioned on the other side of the piston-head, to partially close the ports 26 at times, and is movable freely between the piston-head and the outer nut 24, which overhangs the nut 23, as seen in Fig. 2.

A cup-shaped annulus forms an upper or top valve member 29, its central opening 30 being large enough to receive the nuts 23 and 24, and also to receive the intermediate valve member 28 when it is used. This top valve member 29 is positioned in that portion of the chamber at the side of the piston 25 opposite to the bottom valve member 27.

A spring 31 holds the top valve member 29 to its seat 32, formed in the wall of the bushing 15. One end of this spring 31 is preferably attached, in any suitable manner, to the top valve member 29. The other end may be attached to any suitable fixed element, as, for example, the end wall of the cap 11.

When the device is utilized, for example, upon an automobile, the casing is screwed to the body of the automobile in any suitable or convenient manner (not shown), and the end of the piston rod 18 is screwed to the axle in a similar manner.

It is believed that the operation of the device will be plainly apparent from the foregoing description.

Having described my invention what I regard as new and desire to secure by Letters Patent of the United States, is:

1. A hydraulic valve comprising the combination of a closed cylinder, a piston having ports therethrough, operating in said cylinder, a bottom valve and an intermediate valve member mounted adjacent to said piston, a top valve member seated near one end of said cylinder, means to yieldably hold said valve member in place, there being a plurality of side ports of varying lengths formed in the inner walls of said cylinder, in arrangement whereby the movement of said piston in an upward direction has three distinct ratios of pressure for the one stroke.

2. A hydraulic valve comprising the combination of a closed cylinder, a piston having ports therethrough operating in said cylinder, a bottom valve and an intermediate valve member mounted adjacent to said piston, a top valve member seated near one end of said cylinder, there being a plurality of side ports of varying lengths formed in the inner walls of said cylinder, in arrangement whereby the movement of said piston in an upward direction has three distinct ratios of pressure for the one stroke.

3. A hydraulic valve comprising the combination of a closed cylinder, a bushing which lines said cylinder, a piston having ports therethrough operating in said cylinder, a bottom and an intermediate valve member mounted adjacent to said piston, a top valve member seated near one end of said cylinder, means to yieldably hold said valve member in place, there being a plurality of side ports of varying length formed in the walls of said bushing in arrangement whereby the movement of said piston in an upward direction has three distinct ratios of pressure for the one stroke.

4. A hydraulic valve comprising the combination with a closed cylinder, of a piston rod, a piston carried thereby having ports through its head, a bottom valve member slidably mounted on the piston rod below the piston which closes said ports on the downward movement of the piston, said piston rod extending above the piston, an intermediate valve member, a top valve member yieldingly held in said cylinder which closes the remaining ports as the piston moves upwardly, there being a plurality of ports of varying length in the cylinder wall.

5. A hydraulic valve comprising the combination with a closed cylinder, of a piston rod, a piston carried thereby having ports through its head, a bottom valve member slidably mounted on the piston rod below the piston which closes said ports on the downward movement of the piston, said piston rod extending above the piston, an intermediate valve member, a top valve member yieldingly held in said cylinder which closes the remaining ports as the piston moves upwardly, a bushing which lines said cylinder, there being a plurality of ports of varying length in the walls of said bushing.

6. A hydraulic valve comprising the combination with a closed cylinder, of a piston rod, a piston carried thereby having ports through its head, a bottom valve member slidably mounted on the piston rod below the piston which partially closes said ports on the downward movement of the piston, said piston rod extending above the piston, an intermediate valve member which partially closes the piston ports on its upward movement slidably mounted on said extending portion, means on said piston rod to limit the movement of said intermediate valve member, and a top valve member yieldingly held in said cylinder which closes the remaining ports as the piston moves upwardly, a bushing which lines said cylinder, there being a plurality of ports of varying length in the walls of said bushing.

CLARANCE W. THOMPSON.